United States Patent
Maeder (10) Patent No.: US 12,358,106 B2
(45) Date of Patent: Jul. 15, 2025

(54) SCREWDRIVER ATTACHMENT

(71) Applicant: MAKU AG, Buochs (CH)

(72) Inventor: Reto Maeder, Horw (CH)

(73) Assignee: MAKU AG (CH)

( * ) Notice: Subject to any disclaimer, the term of this patent is extended or adjusted under 35 U.S.C. 154(b) by 386 days.

(21) Appl. No.: 17/898,819

(22) Filed: Aug. 30, 2022

(65) Prior Publication Data

US 2023/0063090 A1 Mar. 2, 2023

(30) Foreign Application Priority Data

Aug. 31, 2021 (DE) ...................... 10 2021 122 528.0

(51) Int. Cl.
*B25B 23/00* (2006.01)
*B25B 23/08* (2006.01)

(52) U.S. Cl.
CPC .......... *B25B 23/0071* (2013.01); *B25B 23/08* (2013.01)

(58) Field of Classification Search
CPC ... B25B 23/005; B25B 23/0071; B25B 23/08; B25B 15/00; B25B 15/02; B23B 31/02; B23B 31/08; B23P 19/069; B23P 19/102; B23P 19/12
See application file for complete search history.

(56) References Cited

U.S. PATENT DOCUMENTS

| | | | | |
|---|---|---|---|---|
| 1,903,660 A | * | 4/1933 | Smith .................... | B25B 13/481 81/177.6 |
| 2,069,882 A | * | 2/1937 | Hall ...................... | B23P 19/069 81/477 |
| 2,430,044 A | * | 11/1947 | Campsmith ......... | B25B 23/1427 81/451 |
| 2,565,505 A | * | 8/1951 | Lamb .................... | B25B 23/005 81/462 |
| 2,626,812 A | * | 1/1953 | Jones ...................... | B23B 31/08 279/16 |
| 2,630,341 A | * | 3/1953 | Downey ................ | B65G 33/32 415/72 |

(Continued)

FOREIGN PATENT DOCUMENTS

DE 20 2021 101 989 U1 5/2021
EP 2657000 10/2013

(Continued)

OTHER PUBLICATIONS

Office Action for Canadian Patent Application No. 3,170,815, dated Nov. 29, 2023, 4 pages.

*Primary Examiner* — David B. Thomas
(74) *Attorney, Agent, or Firm* — Lippes Mathias LLP (57) ABSTRACT

The disclosure relates to a screwdriver attachment for screws, which has a first shaft section with a first longitudinal axis, and a second shaft section with a second longitudinal axis. The second shaft section is coupled to the first shaft section via a linking disk. The first shaft section has a free end with which the screws are turned. The first shaft section and second shaft section are connected to one another by a spring element, which aligns the first shaft section in a starting position in which the first longitudinal axis and the second longitudinal axis are aligned coaxially. Screws can be readily turned with the screwdriver attachment according to the disclosure, even if there is a certain offset between the axes.

19 Claims, 6 Drawing Sheets

(56) References Cited

U.S. PATENT DOCUMENTS

| | | | | |
|---|---|---|---|---|
| 2,796,101 | A * | 6/1957 | Hasemann | B25B 15/02 |
| | | | | 81/177.6 |
| 2,814,322 | A * | 11/1957 | Kupfrian | B25B 13/481 |
| | | | | 81/177.6 |
| 2,851,868 | A * | 9/1958 | Larkin | F16D 3/04 |
| | | | | 464/102 |
| 2,964,152 | A * | 12/1960 | Banner | B23P 19/069 |
| | | | | 81/475 |
| 3,279,510 | A * | 10/1966 | Dreyer | B25B 23/108 |
| | | | | 81/460 |
| 3,406,414 | A * | 10/1968 | Coapman | B25B 23/04 |
| | | | | 470/49 |
| 3,522,713 | A * | 8/1970 | Hayes | F16D 3/38 |
| | | | | 464/57 |
| 3,579,677 | A * | 5/1971 | Ullman | B25B 13/481 |
| | | | | 81/437 |
| 3,889,343 | A * | 6/1975 | Miller | B23P 19/003 |
| | | | | 81/433 |
| 3,930,808 | A * | 1/1976 | Miller | B23P 19/069 |
| | | | | 81/433 |
| 4,092,719 | A * | 5/1978 | Salmon | G05B 19/425 |
| | | | | 700/95 |
| 4,145,802 | A * | 3/1979 | d'Auria | G05B 19/4163 |
| | | | | 901/45 |
| 4,413,937 | A * | 11/1983 | Gutsche | B25F 3/00 |
| | | | | 408/239 R |
| 4,613,000 | A * | 9/1986 | Moore | F16B 5/025 |
| | | | | 173/217 |
| 5,022,645 | A * | 6/1991 | Green | B65H 5/021 |
| | | | | 464/103 |
| 5,056,386 | A * | 10/1991 | Chaconas | B25B 23/101 |
| | | | | 81/452 |
| 5,277,085 | A * | 1/1994 | Tanimura | B23P 19/069 |
| | | | | 81/57.24 |
| 5,431,660 | A * | 7/1995 | Burke | A61B 17/8685 |
| | | | | 411/536 |
| 5,572,905 | A * | 11/1996 | Cook, Jr. | B25B 23/141 |
| | | | | 74/411 |
| 5,595,251 | A * | 1/1997 | Cook, Jr. | B23P 19/069 |
| | | | | 74/411 |
| 5,647,254 | A * | 7/1997 | Cook, Jr. | B25B 23/145 |
| | | | | 81/475 |
| 5,699,703 | A * | 12/1997 | Habele | B25B 23/14 |
| | | | | 73/761 |
| 5,950,509 | A * | 9/1999 | Doong | B25B 21/00 |
| | | | | 81/475 |
| 6,134,989 | A * | 10/2000 | Stevens | B25B 13/48 |
| | | | | 81/57.36 |
| 6,145,416 | A * | 11/2000 | Bonniot | B25B 23/0035 |
| | | | | 81/177.8 |
| 6,517,439 | B1 * | 2/2003 | Sears | F16D 3/04 |
| | | | | 464/106 |
| 6,875,114 | B2 * | 4/2005 | Barron | F16D 3/04 |
| | | | | 403/314 |
| 7,387,054 | B2 * | 6/2008 | Rajotte | B25B 23/0035 |
| | | | | 81/429 |
| 9,505,105 | B2 | 11/2016 | Chang | |
| 10,779,871 | B2 * | 9/2020 | Lutz | A61B 17/8875 |
| 11,499,611 | B2 * | 11/2022 | Tipton | F16H 25/2214 |
| 11,607,779 | B2 * | 3/2023 | Soucy | F16D 1/10 |
| 2012/0132038 | A1 * | 5/2012 | Lefler | B25G 1/025 |
| | | | | 81/177.6 |
| 2016/0016294 | A1 | 1/2016 | Chang | |
| 2020/0282530 | A1 | 9/2020 | Sharifi-Mehr et al. | |

FOREIGN PATENT DOCUMENTS

| | | | | |
|---|---|---|---|---|
| GB | | 2382043 A * | 5/2003 | B23Q 3/12 |
| WO | WO 01/28743 | A1 | 4/2001 | |

* cited by examiner

SCREWDRIVER ATTACHMENT

BACKGROUND OF THE DISCLOSURE

Devices for producing flat sheet products using a slot die are known from the prior art. The gap in the slot die and/or its retention bar can be adjusted using numerous screws located along the lateral extension of the slot die. There is a crossbar for adjusting the screws that extends over the entire width of the slot die, on which a screwdriver machine can be moved back and forth between the screws. The size of the gap in the slot die is preferably adjusted automatically by a control or regulating unit that tightens or loosens the individual screws with the screwdriver machine. The term, "flat sheet products" preferably refers to thin plastic films in the context of the present description.

A thermoplastic material is first heated in the known device until it becomes soft. The sufficiently plasticized material exits the gap in the slot die, which places the plasticized material in the desired film mold. A cooling roller assembly can be downstream of the slot die to ensure a quick cooling of the film material. In order to produce a film strip with a homogenous thickness over its entire width, which is particularly important with thin films, the size of the gap is continuously and fully automatically adjusted with the screwdriver machine by adjusting the screws. This makes it possible to compensate for temperature-related changes in the gap size in the slot die. When changing products, the gap must also be adjusted for the new product. The screws are therefore used for fine tuning as well as adjusting to different products. A retention bar that ensures a uniform distribution of the softened plastic material over the entire width of the slot die can also be adjusted using the screws, which in turn can preferably be automatically adjusted with the screwdriver machine, as is known, for example, from EP 2 657 000 B1.

The invention is not limited to the devices described above. It can also be used on blown film lines or other devices with which there is a fundamental need to adjust numerous screws, preferably for adjusting a gap or a die.

The device described above has proven to be reliable. It has been discovered, however, that in particular with larger slot dies, the screws may be tightened imprecisely, or become twisted.

Based on the prior art, the fundamental object of the invention is to create a screwdriver attachment that overcomes these disadvantages.

SUMMARY OF THE DISCLOSURE

In order to achieve this object, the screwdriver attachment according to the invention has a first shaft section with a first longitudinal axis and a second shaft section with a second longitudinal axis. The first shaft section has a free end with which the screws are turned. The second shaft section is coupled to the first shaft section by linking disk according to the invention. The first shaft section and second shaft section are connected to one another by a spring element that aligns the first shaft section in a starting position in which the first longitudinal axis and the second longitudinal axis are aligned coaxially to one another. The first shaft section is not subjected to a load in this starting position, such that no external forces act on it.

The free end can form a screwdriver bit. Alternatively, a screwdriver bit can be attached thereto, i.e. placed thereon. The free end can have a receiver socket for this.

The invention takes into consideration that the positioning imprecisions and/or twisting are due to thermal fluctuations in the slot die. Tolerance deviations in the construction of the slot die may also play a role. Despite appropriate controls, a slight offset may arise as the screwdriver attachment approaches the respective screw. Even if the screwdriver bit is correctly fitted to the screw, the screw may become twisted, resulting in premature wear. The screwdriver bit may also catch when loosening the screws. This is where the invention comes into play.

The invention ensures a reliable and precise adjustment of screws, in particular in a slot die and/or on a retention bar in a device for producing flat sheet products. In particular, the linking disk prevents a canting of the screwdriver attachment on the screw that is to be adjusted. Even if the axis of the screw is slightly offset in relation to the screwdriver bit, the linking disk enables a torque to be applied to the screw without twisting. This prevents the screwdriver bit from assuming an undesired tilted position. The demands on the positioning precision of the screwdriver machine are thus reduced. The spring element returns the first shaft section, to which the screwdriver bit is connected, to its starting position after turning the screw, such that the screwdriver bit again assumes a defined position.

The spring element is preferably located within the first and second shaft sections. This protects it from disadvantageous environmental effects. The spring element can also extend through the linking disk, as shall be explained in greater detail below.

According to an advantageous development, the spring element preferably forms a linear spring rod. This design results in a simple structure of the spring element with defined reset properties. Moreover, a linear spring rod does not require a lot of radial installation space.

The linking disk preferably has a central hole through which the spring element extends. The spring element can therefore pass entirely through the linking disk in the axial direction. In addition to the protective properties described above, a central placement of the spring element also has dynamic advantages during the screwing process.

One advantageous embodiment is characterized in that the hole has a greater cross section than the cross section of the spring element, and that the cross section of the hole is preferably round. The size of the hole in the linking disk is selected such that the spring element has a certain amount of radial play. This allows the linking disk to be displaced radially within the hole. The screwdriver bit can therefore act on screws that are not precisely aligned with the axis of the screwdriver bit.

The second shaft section preferably has a back end through which the spring element is inserted. This structure allows for a particularly simple attachment and removal of the screwdriver attachment.

The spring element is advantageously connected to a screw, which is threaded into the second shaft section. The screw allows for a reliable attachment of one end of the spring inside the second shaft section. The screw is connected to one end of the spring element. For the assembly, the other (unconnected) end of the spring element is inserted through the second shaft section and the linking disk, into the first shaft section. The screw is then screwed into the second shaft section. To ensure that it does not become loosened inadvertently, the screw can be held in place in the second shaft section with a securing means, in particular an adhesive such as Loctite®.

According to one development of the invention, the linking disk has first tongue on one side, which engages in a first groove in the first shaft section, and a second tongue on the other side, which engages in a second groove in the second shaft section. These tongues form projections. The first and second tongues are preferably orthogonal to one another. As a result, any radial offset between the axes of screwdriver bit and the respective screw can be compensated for. At the same time, the screwdriver attachment can apply a torque without becoming twisted or jammed.

The first and second tongues preferably engage in a form-fitting manner in the first and second shaft sections such that the first and second shaft sections are tightly connected to one another in the directions of the first and second longitudinal axes and they will not be pulled apart when subjected to tensile forces. The respective grooves encompass the respective tongues to the extent that the tongues are kept in their grooves in the directions of the respective longitudinal axes even when subjected to a tensile force. This form-fitting connection ensures that the screwdriver attachment can be readily removed from the head of the screw after it has been adjusted.

In a further development of the invention it is proposed that the second shaft section is received in a receiver unit that has a first fastening ring and second fastening ring, in which case the first and second fastening ring are spaced apart from one another and located on a clamping sleeve that receives the second shaft section. Moving the first fastening ring in relation to the second fastening ring changes the diameter of the clamping sleeve. As a result, the second shaft section can be connected to a drive shaft of an actuator, i.e. a gearing or a motor, for conjoint rotation therewith. This is particularly the case if the second shaft section forms an axial receiver at its back end, as is regarded as particularly preferable. The back end is the free end of the second shaft section. The receiver receives the aforementioned drive shaft. The second shaft section can have at least one slot where the receiver unit is formed, in particular a longitudinal slot, which facilitates a radial reduction of the cross section of the receiver when the clamping sleeve is tightened. The second shaft section does not necessarily need to have this slot. This would result in greater forces being needed, however, to clamp it to the drive shaft. The advantage of not having a slot in the receiver is that the drive shaft can be centered more precisely therein.

The first shaft section preferably has a shaped screwdriver bit with a circumferential centering cone on its end. The centering cone substantially facilitates reliable control of the individual tightening of the screws. Even if the screwdriver bit is radially offset to the screw, the centering cone ensures that the screwdriver bit is reliably placed in or on the screw. The linking disk ensures a necessary flexibility of the screwdriver bit. This means that the shaped screwdriver bit is automatically centered reliably, and the automated placement of the screwdriver attachment in or on the head of a screw that is to be adjusted is substantially facilitated. It should be noted here that the screwdriver bit can be placed either in or on a screw. For this, the centering cone is on either the inside or the outside.

By way of example, the screwdriver bit can have a polygonal inner profile or a polygonal outer profile. The inner profile of the screwdriver bit can form a hexagonal socket, for example. The outer profile can form a hex key or a star bit. Other profiles are also conceivable.

An advantageous embodiment of the invention is characterized in that the spring element can be displaced axially, and has substantially no radial play when it is received in the first shaft section. The axial displacement substantially facilitates the attachment and removal of the screwdriver attachment. Furthermore, the spring element is preferably not subjected to any significant tensions in the axial direction, i.e. it is not subjected to any pressure forces, which increases the mobility of the screwdriver attachment. The lack of radial play ensures that the first shaft section always returns to its starting position. Through the use of the term "substantially," it should be clear that although the intention is to eliminate any radial play, it is still possible to insert and remove the spring element in the framework of this embodiment.

BRIEF DESCRIPTION OF THE DRAWINGS

The invention shall be explained in greater detail below in reference to preferred exemplary embodiments in conjunction with the attached drawings. The elements that have the same or comparable functions are provided with the same reference symbols in all of the drawings for purposes of clarity, and shall only be explained once in each case. In the drawings.

DETAILED DESCRIPTION OF THE DISCLOSURE

Figure 1:
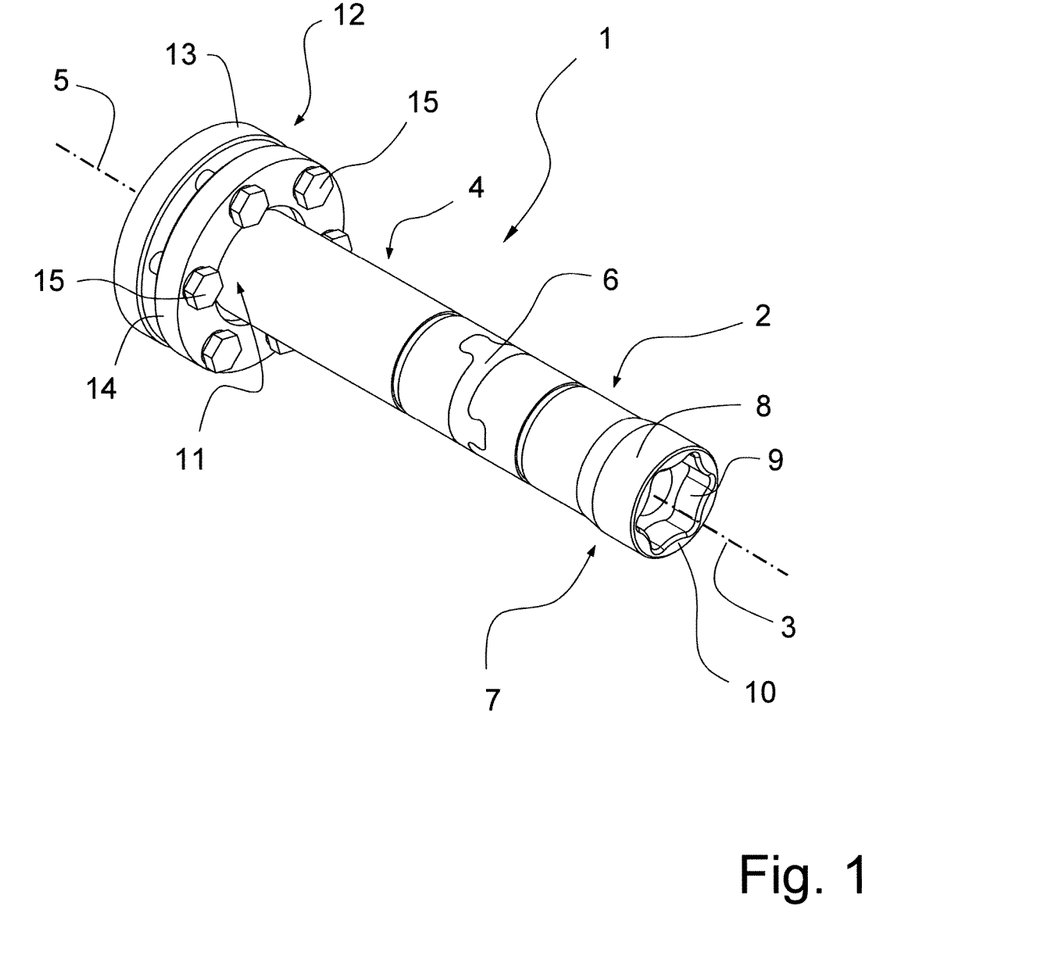
FIG. 1 shows a schematic illustration of a perspective view of a first exemplary embodiment of a screwdriver attachment according to the invention.

FIG. 1 shows a perspective view of a first exemplary embodiment of the screwdriver attachment 1 according to the invention. The screwdriver attachment comprises a first shaft section 2 that has a first longitudinal axis 3, and second shaft section 4 that has second longitudinal axis 5, with the first and second shaft sections 2, 4 being coupled to one another by a linking disk 6. This type of linking disk is also know from an Oldham coupling. A radial offset between the first shaft section 2 and the second shaft section 4 can be compensated for by the linking disk 6. This means that the first shaft section 2 can apply a torque without twisting, and ensure that a screw will be tightened without getting jammed, even when its axis is offset to that of the second shaft section 4.

The first shaft section 2 has a shaped screwdriver bit 8 at its free end 7 for an (adjustment) screw, not shown herein. These are screws in particular for adjusting a slot die and/or a retention bar in a device for producing flat sheet products using an automated screwdriver machine. This device for producing flat sheet products can be a film extrusion line or a similar apparatus. The screwdriver attachment according to the invention is not limited to this application. The screwdriver bit 8 preferably has a polygonal profile 9 and a circumferential centering cone 10 on the end that centers it on the heads of the screws that are to be adjusted. The screwdriver bit 8 can have any, preferably polygonal, inner or outer profile, depending on the respective geometry of the head of the screw. The centering cone 10 is a circumferential bezel, which is formed on either the inside or outside, depending on the form of the screwdriver profile 9.

It should be noted here that the screwdriver attachment according to the invention can be used not only on screws, but also on nuts.

The second shaft section 4 has a back end 11 that is received in a receiver unit 12. The receiver unit 12 is preferably designed as a special unit and has a first fastening ring 13 and second fastening ring 14, which can be tensioned axially against one another with screws 15. The screwdriver attachment 1 can be secured on a drive shaft therewith, as shall be explained in greater detail in reference to FIG. 2.

Figure 2:
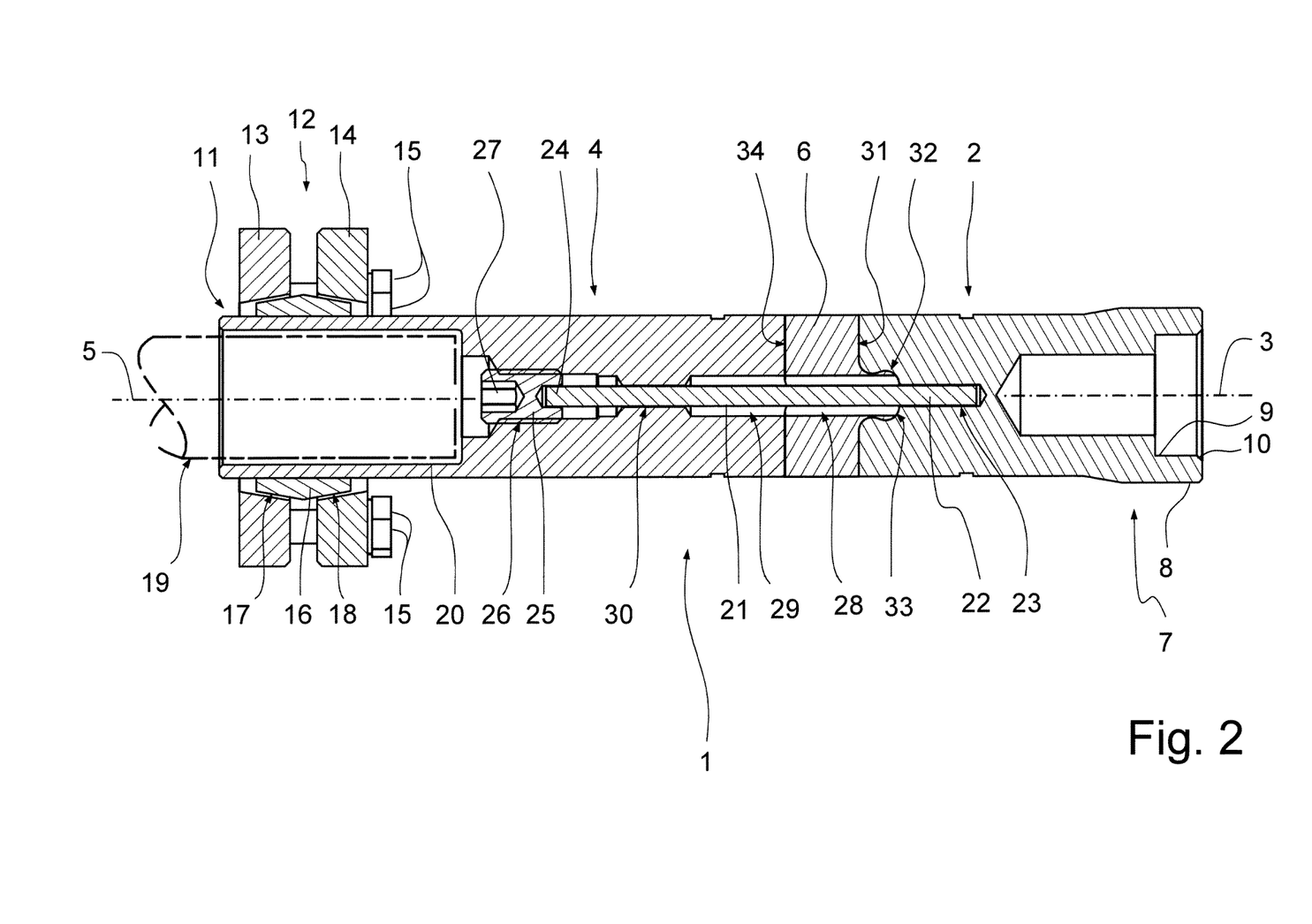
FIG. 2 shows a schematic illustration of a longitudinal sectional view of the screwdriver attachment shown in FIG. 1.

FIG. 2 shows a longitudinal section, cut through the screwdriver attachment 1 shown in FIG. 1. This clearly shows that the first longitudinal axis 3 of the first shaft section 2 and the second longitudinal axis 5 of the second shaft section 4 are coaxial to one another in the unloaded starting state shown here.

FIG. 2 also clearly illustrates the construction of the receiver unit 12. The two fastening rings 13, 14 can be tensioned axially against one another via the screws 15, and are located on a clamping sleeve 16 that has two opposing conical surfaces 17, 18. When the screws are tightened, the two fastening rings 13, 14 move toward one another and clamp the clamping sleeve 16 between them. The conical surfaces 17, 18 cause a reduction in the diameter of the clamping sleeve 16, such that pressure is exerted on the second shaft section 4.

A broken line, indicated by the numeral 19, illustrates a drive shaft for a motor or gearing, which is received in a receiver 20 in the second shaft section 4. The receiver 20 makes it possible to place the screwdriver attachment 1 directly on the drive shaft 19 and secure it there. When the screws 15 are tightened, the aforementioned pressure is exerted on the second shaft section 4 such that the second shaft section 4 is clamped in place in the receiver 20. In order to be able to apply the clamping force of the part of the second shaft section 4 forming the receiver 20 onto the drive shaft 19, at least one slot (not shown here), preferably at least one longitudinal slot, is formed at the back end 11 of the second shaft section 4. In a particularly advantageous manner, this enables a reduction in the diameter of the receiver 20 in order to clamp the drive shaft 19 in place. The receiver 20 can also advantageously be formed without a slot.

The first shaft section 2 and the second shaft section 4 are connected to one another by a spring element 21. The spring element 21 ensures that the first shaft section 2 is aligned with the second shaft section 4 when not subjected to a load. At this point, the longitudinal axes 3, 5 of the shaft sections 2, 4 are coaxial to one another.

The spring element 21 preferably forms a linear spring rod. The spring rod preferably has a round cross section, but it can also be polygonal, i.e. square. It can be made of spring steel, for example.

The spring element 21 is concentric to the longitudinal axes 2, 5 of the shaft sections 2, 4 in the unloaded state shown in FIG. 2. The longitudinal axes 3, 5 and the spring element 21 therefore advantageously lie on the same axis. One end 22 of the spring element 21 is inserted into the first shaft section 2. The first shaft section 2 has a bore hole 23 for this.

The other end 24 of the spring element 21 is received in a screw 25 that is threaded into the second shaft section 4. The second shaft section 4 has an internal threading 26 for this, into which the screw 25 is screwed in the assembled state. The screw 25 advantageously has a profile 27 for this, e.g. a hexagonal socket. The spring element 21 is glued, pressed, or soldered into the screw 25. It can also be screwed into the screw 25. In this case, the spring element 21 has an external threading.

To assemble the screwdriver attachment 1 according to the invention, the first and second shaft sections 2, 4 are first joined to the linking disk 5, such that they are aligned with one another. The spring element 21 is then inserted through the back end 11 of the second shaft section 4 and through the linking disk 6, into the first shaft section 2, which preferably has a hole 24 for this, as explained above. The screw 25 is screwed into the second shaft section 4 by means of the profile 27 in order to fix the spring element 21 in place. It can then also be secured by an additional adhesive.

The spring element 21 is securely received in the screw 25, such that it is axially fixed in place in the second shaft section 4. The end 22 of the spring element 21 can move axially in the first shaft section 2, and is substantially free of play in the radial direction. When the screwdriver attachment 1 is not subjected to a load, the spring element 21 therefore aligns the first shaft section 2 coaxially with the second shaft section 4. At the same time, the spring element 21 can advantageously be inserted into and removed from the first shaft section 2, i.e. it can preferably move axially therein, in order to assemble and disassemble the screwdriver attachment.

In order for the spring element 21 to be able to pass through it, the linking disk 6 preferably has a hole 28 passing through it. The second shaft section also preferably has a hole 29 passing through it. The hole 23 in the first shaft section 2 can be a blind hole.

The screwdriver attachment 1 according to the invention allows for a radial offset of the first shaft section 2 in relation to the second shaft section 4 due to the linking disk 5. The two longitudinal axes 3, 5 are then no longer coaxial, but instead are parallel to one another. To make it possible to deflect the first shaft section 2 in relation to the second shaft section 4, the hole 28 passing through the linking disk 6 has a greater diameter than the spring element 21. In other words, the hole 28 provides room for the spring element 21 to move radially, in order for the spring element 21 to also be deflected. To give the spring element 21 even more space in which to move radially, the hole 29 through the second shaft section 4 can also have a greater diameter than the spring element 21. In order to also center the spring element 21 in the second shaft section 4, the spring element 21 is held in place in a centering hole 30 in the second shaft section 4 with substantially no play. This means that the spring element can pass through the centering hole 30, which allows for very little radial play, in order to center it.

Figure 3:
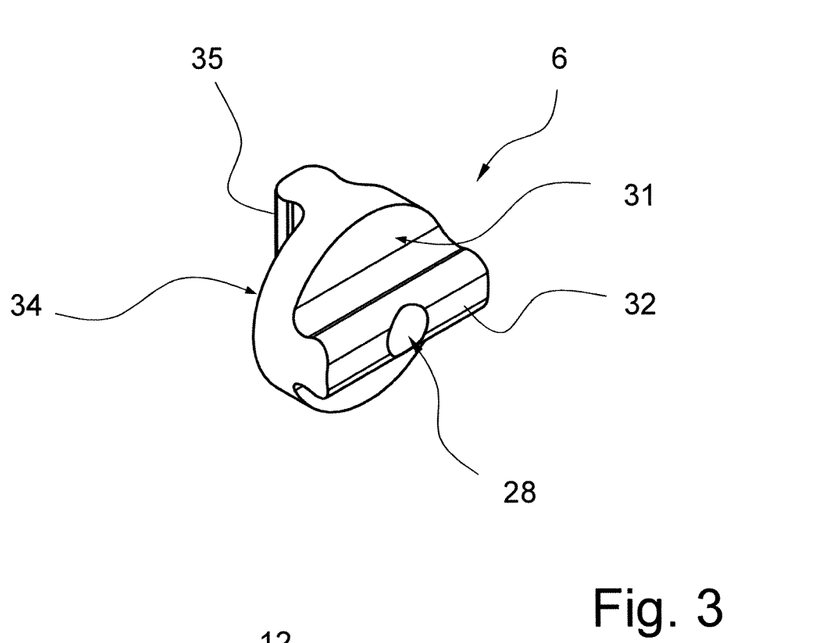
FIG. 3 shows a schematic illustration of a perspective view of a linking disk for the screwdriver attachment shown in FIG. 1.
Figure 4:
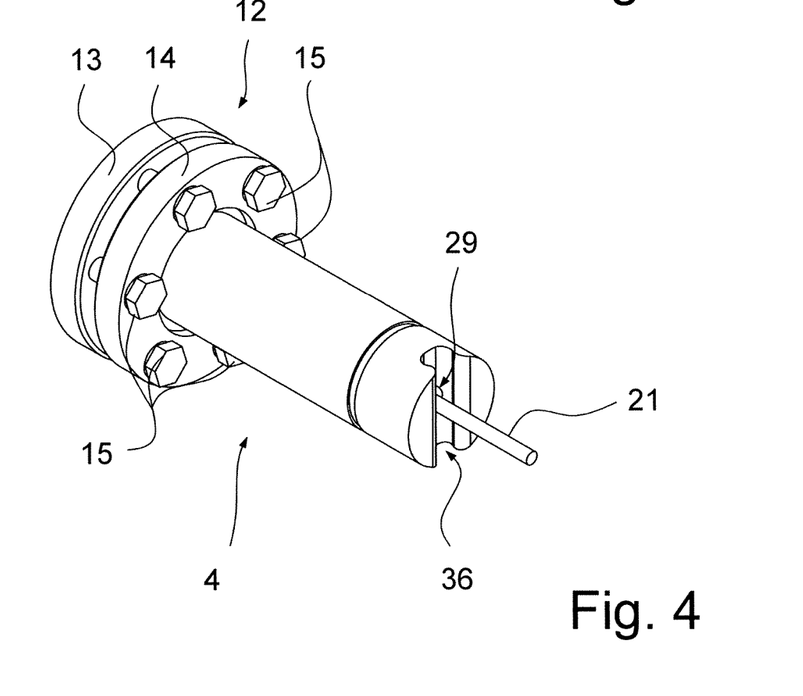
FIG. 4 shows a schematic illustration of a perspective view of the second shaft section of the screwdriver attachment shown in FIG. 1.
Figure 5:
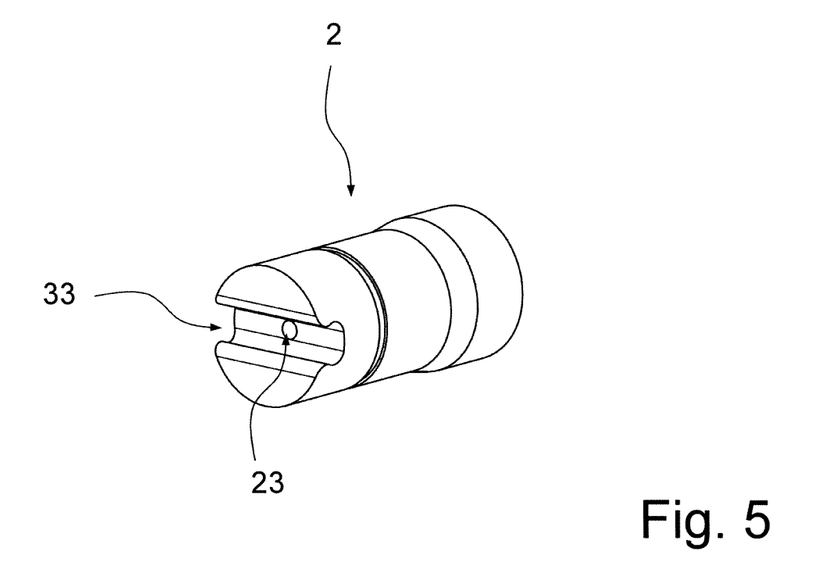
FIG. 5 shows a schematic illustration of a perspective view of the first shaft section of the screwdriver attachment shown in FIG. 1.

The placement of the linking disk 6 between the first and second shaft sections 2, 4 shall be described below in reference to FIGS. 2 to 5. FIG. 2 shows a sectional illustration of the assembled screwdriver attachment 1. FIG. 3 shows the linking disk 6 by itself. FIG. 4 shows the second shaft section 4 by itself (including the receiver unit 12). FIG. 5 shows the first shaft section 2 by itself.

The linking disk 6 has a first tongue 32 on the first side 31, which faces the first shaft section 2 and engages in a first groove 33 in the first shaft section 2 (see FIG. 5). A second tongue 35 is formed on the second side 34 of the linking disk 6, opposite the first side 31 and orthogonal to the first tongue 32, which engages in a second groove 36 formed in the second shaft section 4 (see FIG. 4).

The grooves 33, 36 in the shaft sections 2, 4 are complementary to the tongues 32, 35 in the linking disk 6, in order to obtain an at least partially indented form fit. It should be understood that the form-fit is created such that the tongues 32, 35 can still move in their associated grooves 33, 36.

The important thing is that the grooves 33, 36 in the shaft sections 2, 4 are formed such that the shaft sections 2, 4 partially encompass the respective tongues 32, 35. In this example, the tongues 32, 35 in the linking disk 6 and the associated grooves 33, 36 in the shaft sections 2, 4 are formed in the manner of a jigsaw puzzle with regard to their cross sections. As a result of the form-fitting engagement described above, the linking disk 6 can transfer both pressure forces as well as tensile forces between the two shaft sections 2, 4, such that the screwdriver bit 8 can be readily removed from the head of an adjusted screw after an automated adjustment procedure.

It can also be clearly seen in FIG. 3 that the linking disk 6 has a central hole 28 passing through it. This is preferably greater than the spring element 21, such that it provides the spring element 21 with room to move radially therein. The tongues 32, 35 are at a right angle to one another, i.e. rotated 90° to one another over the hole 28.

It can also be readily seen in FIG. 4 that the second shaft section 4 has a hole 29 passing through it, through which the spring element 21 passes. This hole 29 also preferably has a greater diameter than the spring element 21, at least at the end adjoining the linking disk 6, such that the spring element 21 can move radially therein.

Figure 6:
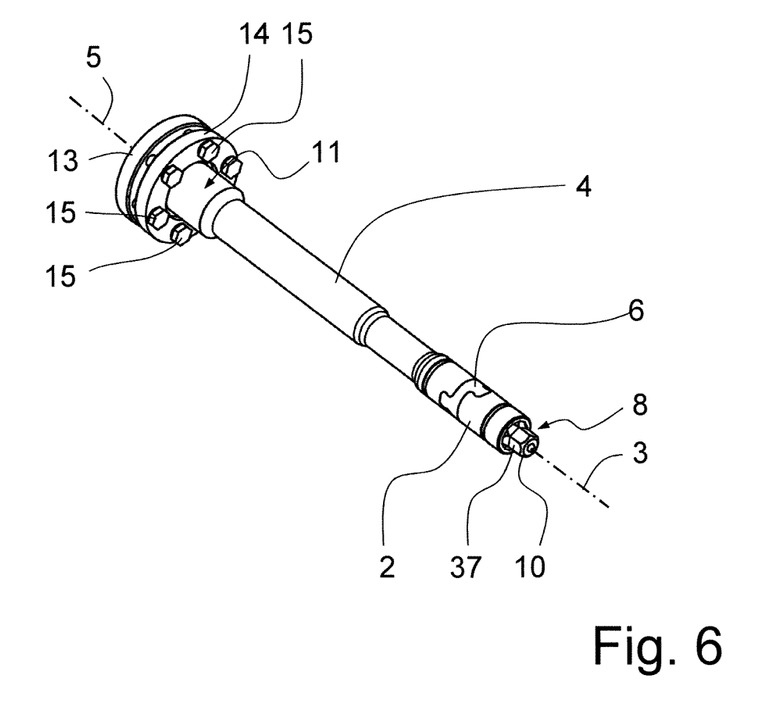
FIG. 6 shows a schematic illustration of a perspective view of a second exemplary embodiment of a screwdriver attachment according to the invention.
Figure 7:
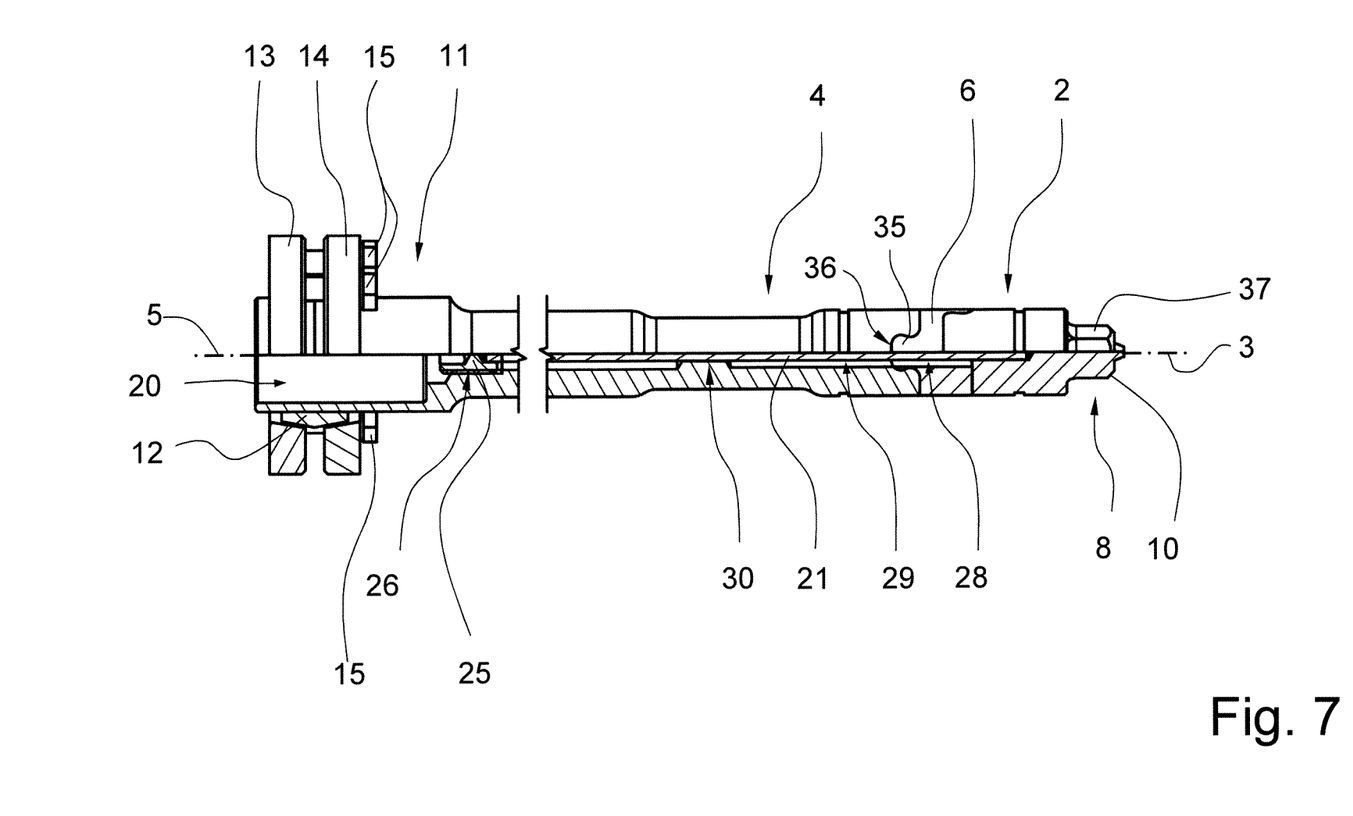
FIG. 7 shows a schematic illustration of a sectional view of the screwdriver attachment shown in FIG. 6.

FIGS. 6 and 7 show a second exemplary embodiment of the screwdriver attachment according to the invention.

A substantial difference to the first exemplary embodiment is that the screwdriver bit 8 is not in the form of a bit with an inner profile, but instead has an outer profile 37, presently in the form of a hex key. This screwdriver bit 8 also forms a centering cone 10. As a result, the screwdriver bit 8 can also be reliably inserted into a screw (not shown here), even if there is a slight radial axis offset.

Another difference to the first exemplary embodiment is that the second exemplary embodiment has a longer second shaft section 4. This makes it possible for the screwdriver attachment to span greater distances between a screwdriver machine and the screw it is to adjust. The centering hole 30 is of particular importance here. It ensures that the spring element 21—which is also preferably in the form of a spring rod in this case—is supported inside the second shaft section 4, in order that the spring element 4 can provide sufficient spring force and a reliable centering function, even when the second shaft section 4 is longer. Reference is made to the description of the first embodiment with regard to the rest.

Figure 8:
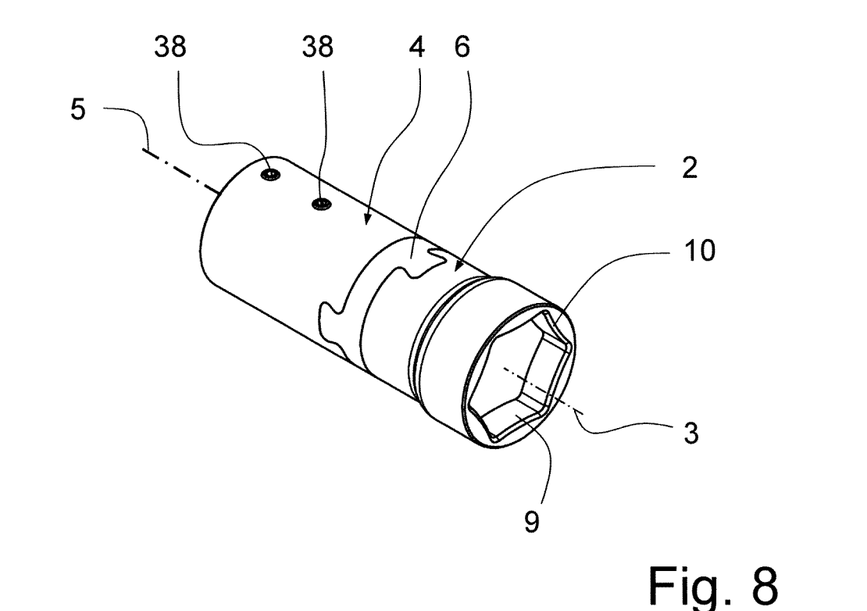
FIG. 8 shows a schematic illustration of a perspective view of a third exemplary embodiment of a screwdriver attachment according to the invention.
Figure 9:
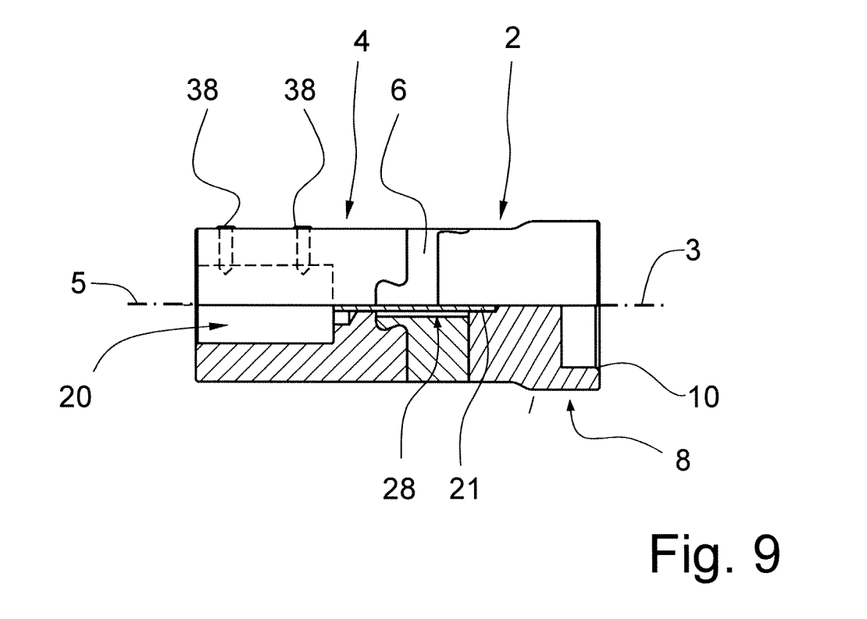
FIG. 9 shows a schematic illustration of a sectional view of the screwdriver attachment shown in FIG. 8.

FIGS. 8 and 9 show a third exemplary embodiment of the screwdriver attachment according to the invention. This exemplary embodiment is clearly shorter than the first and second exemplary embodiments in the longitudinal direction. Although the linking disk 6 has a hole 28 passing through it that has a greater cross section than the spring element 21, the second shaft section 4 does not have an expanded hole 29 passing through it (see FIGS. 2 and 7). This exemplary embodiment also does not have a screw 25. Instead, the spring element 21 is pressed, glued, or soldered directly into the second shaft section 4. All of the exemplary embodiments have in common that the second shaft section 4 has a receiver 20 for a drive shaft. The (not shown) drive shaft is secured in place using a grub screw. Reference is made to the descriptions of the other two exemplary embodiments with regard to the rest.

LIST OF REFERENCE SYMBOLS 1 screwdriver attachment
2 first shaft section
3 longitudinal axis
4 second shaft section
5 longitudinal axis
6 linking disk
7 free end
8 screwdriver bit
9 profile
10 centering cone
11 back end
12 receiver unit
13 fastening ring
14 fastening ring
15 screw
16 clamping sleeve
17 conical surface
18 conical surface
19 drive shaft
20 receiver
21 spring element
22 end
23 hole
24 end
25 screw
26 internal threading
27 profile
28 hole
29 hole
30 centering hole
31 first side
32 first tongue
33 first groove
34 second side
35 second tongue
36 second groove
37 outer profile
38 grub screw

The invention claimed is:

1. A screwdriver attachment for screws, comprising:
   a first shaft section with a first longitudinal axis, and
   a second shaft section with a second longitudinal axis, which is coupled to the first shaft section via a linking disk,
   wherein the first shaft section has a free end with which the screws are able to be turned,
   wherein the first shaft section and the second shaft section are connected to one another by a spring element, which aligns the first shaft section in a starting position in which the first longitudinal axis and the second longitudinal axis are aligned coaxially, and
   wherein the second shaft section has a back end through which the spring element is inserted.

2. The screwdriver attachment according to claim 1, wherein the spring element is located within the first and second shaft sections.

3. The screwdriver attachment according to claim 1, wherein the spring element is in the form of a linear spring rod.

4. The screwdriver attachment according to claim 1, wherein the linking disk has a central hole passing through it, through which the spring element passes.

5. The screwdriver attachment according to claim 4, wherein the hole has a greater cross section than that of the spring element, wherein the cross section of the hole is round.

6. The screwdriver attachment according to claim 1, wherein the spring element is connected to a screw that is threaded into the second shaft section.

7. The screwdriver attachment according to claim 1, wherein the linking disk has a first tongue on a first side, which engages in a first groove in the first shaft section, and a second tongue on the other side, which engages in a second groove in the second shaft section, wherein the first and second tongues are orthogonal to one another.

8. The screwdriver attachment according to claim 7, wherein the first and second tongues engage in the first and second shaft sections such that the first and second shaft sections are connected to one another in a form-fitting manner, such that they cannot be pulled apart when subjected to tensile forces along the first and second longitudinal axes.

9. A screwdriver attachment for screws, comprising:
a first shaft section with a first longitudinal axis, and
a second shaft section with a second longitudinal axis, which is coupled to the first shaft section via a linking disk,
wherein the first shaft section has a free end with which the screws are able to be turned,
wherein the first shaft section and the second shaft section are connected to one another by a spring element, which aligns the first shaft section in a starting position in which the first longitudinal axis and the second longitudinal axis are aligned coaxially,
wherein the second shaft section is received in a receiver unit, which has a first fastening ring and a second fastening ring, wherein the first and second fastening rings are spaced apart and located on a clamping sleeve in which the second shaft section is received.

10. The screwdriver attachment according to claim 9, wherein the second shaft section has a receiver on its back end for receiving a drive shaft.

11. The screwdriver attachment according to claim 9, wherein the first shaft section has a shaped screwdriver bit with a centering cone surrounding the end thereof.

12. The screwdriver attachment according to claim 9, wherein the screwdriver bit has one of a polygonal inner profile and a polygonal outer profile.

13. A screwdriver attachment for screws, comprising:
a first shaft section with a first longitudinal axis, and
a second shaft section with a second longitudinal axis, which is coupled to the first shaft section via a linking disk,
wherein the first shaft section has a free end with which the screws can be turned, and
wherein the first shaft section and the second shaft section are connected to one another by a spring element;
wherein said spring element has an end which is configured to substantially remain in alignment with said first longitudinal axis of said first shaft section when an offset between said first shaft section and said second shaft section occurs.

14. The screwdriver attachment according to claim 13, wherein the spring element provides alignment of the first and second shaft sections at least radially.

15. The screwdriver attachment according to claim 13, wherein the spring element is in the form of a linear spring rod.

16. The screwdriver attachment of claim 15, wherein said end of said spring element is seated in a bore of said first shaft section such that said end does not incur radial play within said bore.

17. A screwdriver attachment for screws, comprising:
a first shaft section with a first longitudinal axis, and
a second shaft section with a second longitudinal axis, which is coupled to the first shaft section via a linking disk,
wherein said linking disk compensates for radial offset between said first shaft section and said second shaft section,
wherein the first shaft section has a free end with which the screws can be turned,
wherein said first shaft section applies torque to tighten said screws when said first longitudinal axis of said first shaft section is offset from said second longitudinal axis of said second shaft section;
wherein said first shaft section and said second shaft section are connected together by a spring element which has an end located in a bore of said first shaft section wherein said bore retains said spring element in substantial alignment with said first longitudinal axis when a radial offset occurs between said first shaft section and said second shaft section.

18. The screwdriver attachment according to claim 17, wherein the spring element is located within the first and second shaft sections.

19. The screwdriver attachment according to claim 17, wherein the spring element is in the form of a linear spring rod.

* * * * *